United States Patent [19]
Chan et al.

[11] Patent Number: 5,880,717
[45] Date of Patent: Mar. 9, 1999

[54] AUTOMATIC CURSOR MOTION CONTROL FOR A TOUCHPAD MOUSE

[75] Inventors: Chow Fong Chan; Eng Yue Ong; Swee Hock Aluin Lim; Xia Geng, all of Singapore, Singapore

[73] Assignee: Tritech Microelectronics International, Ltd., Singapore, Singapore

[21] Appl. No.: 815,033

[22] Filed: Mar. 14, 1997

[51] Int. Cl.$^6$ .................................................. G09G 5/00
[52] U.S. Cl. .................................. 345/173; 345/159
[58] Field of Search .................................. 345/156, 157, 345/173, 174, 175, 159; 178/18, 19

[56] References Cited

U.S. PATENT DOCUMENTS

| | | | |
|---|---|---|---|
| 5,266,750 | 11/1993 | Yatsuzuka | 178/19 |
| 5,327,161 | 7/1994 | Logan et al. | 345/157 |
| 5,376,946 | 12/1994 | Mikan | 345/157 |
| 5,543,590 | 8/1996 | Gillespie et al. | 178/18 |
| 5,543,591 | 8/1996 | Gillespie et al. | 178/18 |

*Primary Examiner*—Matthew Luu
*Attorney, Agent, or Firm*—George O. Saile; Stephen B. Ackerman; Bill Knowles

[57] ABSTRACT

A method and means for the control of a cursor upon a display screen of a computer system by a pointed object such as a pen, stylus, or finger upon an electrical writing surface is disclosed. The method and means will allow the cursor to continue to scroll across the display screen in a fixed direction and at a fixed speed once the pointed object has transited from a workzone region to an edgezone region of the touchpad. Once the pointed object is in the edgezone region, the pointed object may be stopped. If a different direction or speed of movement of the cursor is desired, the pointed object can be moved in the new direction to establish the new direction and speed of movement of the cursor. The control of the cursor will return to the normal movement when the pointed object returns to the workzone from the edgezone.

23 Claims, 12 Drawing Sheets

AUTOMATIC CURSOR MOTION CONTROL FOR A TOUCHPAD MOUSE

RELATED PATENT APPLICATIONS

TMI96-011,

Title: A Method and System for Data Averaging For Pen-input Devices,

Ser. No.: 08/785,629, Filing Date: Jan. 17, 1997,

Assigned to the Same Assignee as the present invention.

TMI96-012,

Title: A Command Set For Touchpad Pen-input Mouse,

Ser. No.: 08/785,726, Filing Date: Jan. 17, 1997, Assigned to the Same Assignee as the present invention.

TMI96-013,

Title: A Touchpad Pen-input Controller, Ser. No.: 08/785,738, Filing Date: Jan. 17, 1997, Assigned to the Same Assignee as the present invention.

TMI96-014,

Title: A Touchpad Mouse Controller,

Ser. No.: 08/785,724, Filing Date: Jan. 17, 1997,

Assigned to the Same Assignee as the present invention.

TMI96-015

Title: A Touchpad, Pen-Input and Mouse Controller,

Ser. No.: 08/785,739, Filing Date: Jan. 17, 1997,

Assigned to the Same Assignee as the present invention.

TMI96-021,

Title: Multiplexed Analog-to-Digital Converter For Absolute and Relative Voltage Measurements, Ser. No.: 08/785,735, Filing Date: Jan. 17, 1997, Now issued as U.S. Pat. No. 5,736,949, Issue Date Apr. 7, 1998

Assigned to the Same Assignee as the present invention.

BACKGROUND OF THE INVENTION

1. Field Of The Invention

The present invention relates to computer input devices such as digitizers referred to as a touchpad for the control of a cursor upon a display screen of a computer system, and more particularly to the systems and methods necessary to acquire signals from such input devices and to convert the acquired signals to digital codes necessary to control a cursor upon a display screen.

2. Description of Related Art

Touchpads are small digitizer based input devices that are used to replace a computer input device commonly referred to as a mouse. The touchpad digitizers may be of three types, capacitive, resistive and electromagnetic.

Referring to FIG. 1, the surface 12 of the touchpad becomes a "writing surface" for capturing the position of an pointed object 10 such as a finger, pen or stylus upon the touchpad. The touchpad signals are analog signals that will be captured by a touchpad interface circuit 28 and translated to digital codes that will be transferred to a computer system 32 on an interface 30. The interface 30 may be an industry standard serial interface, an industry standard parallel interface, or a custom interface requiring special adapter circuitry within the computer system 32 to accept the digital codes from the touchpad interface 28.

An example of a resistive touchpad, as shown in FIG. 1, is made up of multiple layers of resistive films and protective layers. The protective hard coating 12 is the surface onto which the pointed object 10 is pressed upon. A first layer of resistive film 14 is attached to the protective hard coating 12 on the surface opposite the writing surface. This first layer of resistive film forms the Y-plane of the touchpad. Attached to the surface of the Y-plane resistive film 14 opposite the surface attached to the hard protective coating 12 is a second resistive film 16. This second resistive film 16 forms the X-plane of the touchpad. Finally attached to the side of the X-plane resistive film 16 is a supporting back layer 18. This back layer provides protection and mechanical support for the for the X-plane and Y-plane resistive films 14 and 16.

The touchpad interface 28 is connected through the touchpad interface lines 20, 22, 24, and 26. Each line will provide a stimulus such as a current or voltage to the periphery of the X-plane resistive film 16 and the Y-plane resistive film 14. As shown in FIG. 2, as the pointed object 10 is pressed 40 on the touchpad surface 12, the Y-plane resistive film 12 will deform and touch the X-plane resistive film 14. The X-plane resistive film can not deform because it is supported by the supporting back layer 18. This causes the Y-plane resistive film 14 and the X-plane resistive film 16 to come into contact with each other. This will cause a response in the form a change in voltage or current depending upon whether the stimulus from the touchpad interface 28 of FIG. 1 is a constant voltage or a constant current. If the stimulus from the touchpad interface 28 of FIG. 1 is a constant voltage the currents through the touchpad interface lines 20, 22, 24, and 26 will be modified according the position of the pointed object 10 on the touchpad surface 12. However, if the stimulus from the touchpad interface 28 of FIG. 1 is a constant current the voltages between the touchpad interface lines 20, 22, 24, and 26 will be modified according the position of the pointed object 10 on the touchpad surface 12.

Within the touchpad interface 28 of FIG. 1 will be a touchpad driver. The drivers will consist of metal oxide semiconductor transistors (MOST) M1, M2, M3, and M4 that will selectively couple the power supply voltage source Vdd and the ground reference point GND to the X-plane 16 and the Y-plane 14. When the pointed object 10 is pressed on the touchpad 110 at point 40, the driver select lines X+sel and X−sel will be activated applying the power supply voltage source Vdd to one side on the X-plane at the Vx+ and the ground reference point GND to the opposite side of the X-plane at the Vx−.

The parasitic resistances Rpx+ and Rpx− represent the resistance of the distribution network respectively from point X+ to the side of the X-plane at Vx+ and the on resistance of the MOST M1 and the from the point X− to the opposite side of the X-plane at Vx− and the on-resistance of the MOST M2.

The resistors Rpx+, $R_{xplane}$, and Rpx− form a voltage divider network. The pointed object 10 for the Y-plane 14 to contact X-plane 16 at point Vx. The point Y− will be the sense point for the voltage Vx developed at the contact point.

After the select lines X+ sel and X− sel are deactivated, the select lines Y+ sel and Y− sel are activated, connecting the power supply voltage source Vdd to the Y-plane at point Vy+ and the ground reference point GND to the Y-plane at point Vy−.

As described above, parasitic resistors Rpy+ and Rpy− will be formed as a result of the distribution network and the on-resistances of the MOST M3 and M4.

The resistors Rpy+, $R_{yplane}$, and Rpy− form a voltage divider network. The pointed object 10 has forced the Y-plane 14 to contact the X-plane 16 at point Vx. Now the point X− will sense the voltage developed at the point Vx.

Referring back to FIG. 1, the touchpad interface 28 will have a set of analog to digital converters that will sense the change in the analog responses from the touchpad interface lines 20, 22, 24, and 26 and convert them to digital codes indicating the absolute position of the pointed object 10 upon the touchpad surface 12. For the computer system 32 to use the absolute coordinates generated by the touchpad interface 28 to control the movement of the cursor 36 upon the display screen 34, these absolute coordinates must be modified to codes that define the relative motion of the cursor 36. The relative motion will be the speed and direction of the cursor 36 as it is moved across the display screen 34. The modification from absolute coordinates to relative motion information must be done within an internal mouse emulation program resident within the computer system 32 or the touchpad interface 28.

If the touchpad is to emulate the mouse movements, when the cursor 36 is to be moved across the display screen 34 for a relatively long distance, the pointed object 10 must be lifted and placed back on the touchpad surface 12 repeatedly giving a "rowing" motion to get the cursor 36 to move the long distance. In traditional mouse operations, if the cursor 36 is to drag an object being displayed upon the display screen 34 a button on the mouse is depressed while the mouse is moved. The button can be held depressed while the mouse is moved in the rowing motion to drag the object across the display screen 34. This is difficult to accomplish on the touchpad. If the pointed object 10 is lifted from the touchpad, the touchpad interface 28 will not be able to communicate the "rowing" motion to indicate that the cursor 36 is to travel a long distance. Also, the touchpad interface 28 will not be able to communicate that there is an intention for the cursor 36 to drag the object on the display screen 34. Additional buttons must be added to the touchpad or special areas within the surface of the touchpad surface 12 in order for the touchpad interface 28 to communicate the desire for the cursor 36 to be moved long distances across the display screen 34 or that the cursor 36 is to drag objects upon the display screen 34.

U.S. Pat. No. 5,327,161 (Logan, et al.) use a method to emulate mouse input devices using a program resident within a computer system. A touchpad input device has a controller that generates a digital code that contains the absolute position of a pen or finger on the mouse pad. This requires a special interface that is unique to the touchpad circuitry. Additionally, this patent describes a method for the continuation of cursor movement when a pointed object is touching the touchpad and has been moved on the touchpad to a special border area. The pointed object must be stopped within the border for the continuous motion to be engaged. The direction of the scrolling may be made as a modification of the original direction and velocity of the pen prior to the transiting and stopping within the border area of the touchpad. This modification will be made as a change in the velocity of the movement of the cursor along an axis parallel to the edge of the touchpad adjacent to the border area where the pointed object is resting.

U.S. Pat. No. 5,376,946 (Mikan) describes a circuit using an EPROM to convert signals from a touch screen adhered to a computer display screen to digital codes of the industry standard computer input mouse protocols.

U.S. Pat. No. 5,266,750 Yatsuzuka) discloses a tablet input device and circuitry for providing stimulating voltages to the tablet input device and for sensing the response voltages from the tablet input device when the tablet input device is being pressed. The circuitry provides an OFF state wherein power to the tablet is minimized during a waiting period.

U.S. Pat. No. 5,543,590 (Gillespie, et al.) describes a sensor system that can detect the location of a finger or stylus on a sensor matrix. The location is determined and translated as electrical signals for use in other circuitry such as a computer system to control a cursor upon a display screen. Further this patent discusses an "edge motion" detection feature that will allow a finger or stylus within a "outer zone" of the sensor matrix to move the cursor across a display screen for long distances and avoid the "rowing" motion.

U.S. Pat. No. 5,543,591 (Gillespie, et al.) discloses methods for recognizing tapping, pushing, hopping and zigzagging gestures upon a conductive sensor pad that can be interpreted into cursor control motions such as clicking, double clicking, and click and drag use with computer mouse devices. Further this patent also describes the "edge motion" feature as described in U.S. Pat. No. 5,543,590 (Gillespie, et al.).

SUMMARY OF THE INVENTION

An object of this invention is the interpreting of signals acquired from a computer input device such as a digitizing touchpad that represent the location of a pointed object such as finger, stylus, or pen upon the touchpad and converted to a detect signal indicating the presence of the pointed object upon the touchpad, and to digital codes that represent the location of the pointed object upon the touch pad, and to digital codes that represent the speed and direction of movement of the pointed object upon the touchpad, to determine when the pointed object has transited from a workzone area of the touchpad to an edgezone area of the touchpad. When the pointed object has crossed into the edgezone area of the touchpad, it is further an object of this invention to transmit a set of autocursor digital codes that contain a constrained speed and a constrained direction, and a free-motion speed and a free-motion direction, to the computer system to control movement of a cursor upon a display screen.

To accomplish these and other objects a method for the automatic cursor motion control senses the absolute location of the pointed object upon the touchpad to determine when the pointed object has transited a boundary from the workzone area to the edgezone area. If the pointed object has transited the boundary from the workzone area to the edgezone area at a threshold speed, the method for automatic cursor motion control is activated. The constrained speed and constrained direction, and the free-motion speed and free-motion direction are fixed to predefined values and placed in the autocursor digital codes. The autocursor digital codes are then transmitted to the computer system.

If the pointed object becomes stationary within the edgezone area, the autocursor motion digital codes are continuously transmitted to the computer system to scroll the cursor across the display screen. If the pointed object is moving in the constrained direction, the constrained speed is incremented by a factor and a new set of autocursor digital codes are transmitted to the computer system to modify the speed of the cursor moving upon the display screen. If the pointed object is moving in the free-motion direction, the free-motion speed is set to the current speed from the digital codes that represent the speed and direction of the pointed object upon the touchpad. The new free-motion speed is placed in the autocursor digital codes and transmitted to the computer system to modify the movement of the cursor upon the display screen. If the pointed object enters a corner area of the edgezone, the free-motion speed is set to the constrained speed and placed in the autocursor digital codes.

The new autocursor digital codes are then transmitted to the computer system to modify the motion of the cursor upon the display screen.

When the pointed object transits from the edgezone area to the workzone area, or the pointed object is lifted from the touchpad surface, the method for automatic cursor motion control is terminated. If the pointed object is in the workzone, the digital codes containing the current speed and direction of the pointed object are then transmitted to the computer system. If the pointed object is lifted from the touchpad surface, the autocursor digital codes are no longer transmitted to the computer system.

DETAILED DESCRIPTION OF THE INVENTION

Figure 3:
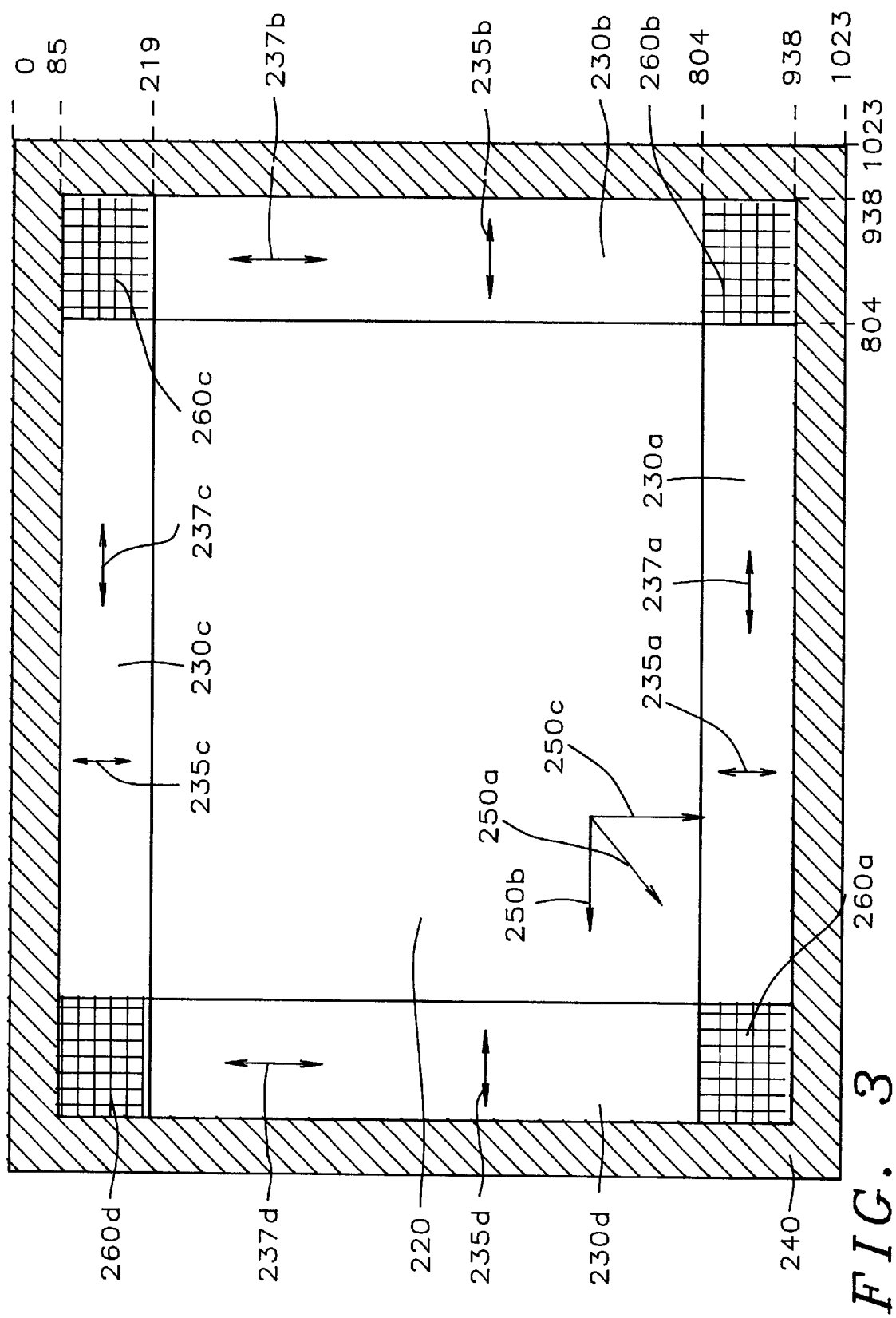
FIG. 3 is an illustration of a touchpad coordinate plane showing the workzone and edgezone area for autocursor motion of this invention.

The surface of the touchpad 110, as illustrated in FIG. 3, has the surface of the touchpad 110 divided into a workzone area 220 and an edgezone area 230a, 230b, 230c, and 230d. The workzone area 220 is the area of the touchpad 110 where a pointed object in contact with the touchpad 110 will control the cursor upon a display screen of a computer system in a manner that emulates a computer mouse input device. A touchpad mouse controller will transmit a digital code that contains the relative motion (the speed and direction) of the pointed object upon the touchpad surface 110, as the pointed object is moved.

The edgezone area 230a, 230b, 230c, and 230d is an area of the touchpad which is designated as the area where automatic cursor motion is enabled. When automatic cursor motion is enabled, the touchpad mouse controller will send the digital codes indicating the cursor is to be scrolled for long distances on the display screen even if the pointed object is stationary on the touchpad 110.

As the pointed object moves in the path 250a on the surface of the touchpad 110, the touchpad mouse controller will send the digital codes that contain a horizontal component 250b and a vertical component 250c of the relative motion of the path 250a. If the pointed object transits from the workzone area 220 to the edgezone area 230a, the digital codes are modified such that a predetermined value or constrained motion is transmitted as the vertical component 250c and a small value or free-motion is transmitted as the horizontal component 250b. This will cause the cursor to scroll toward the bottom edge of the display screen.

Table 1 shows the constrained direction and the free-motion direction for each of the edgezone areas 230a, 230b, 230c, and 230d:

TABLE 1

| Edgezone | Constrained Direction | Free-Motion Direction |
| --- | --- | --- |
| 230a | Vertical Up/Down 235a | Horizontal Left/Right 237a |
| 230b | Horizontal Left/Right 235b | Vertical Up/Down 237b |
| 230c | Vertical Up/Down 235c | Horizontal Left/Right 237c |
| 230d | Horizontal Left/Right 235d | Vertical Up/Down 237d |

Figure 4:
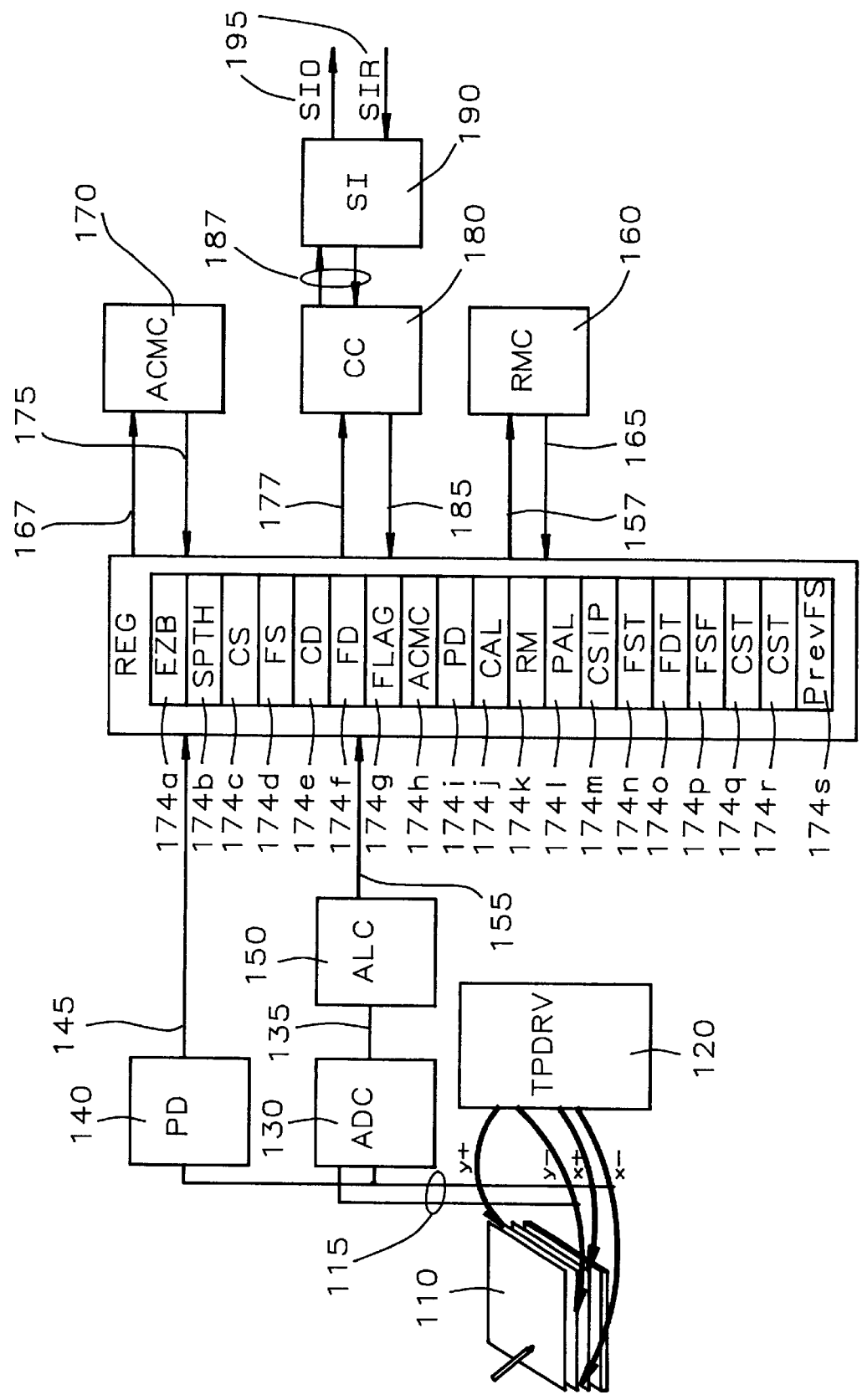
FIG. 4 is a block diagram of the touchpad control system showing an automatic cursor motion controller of this invention.
Figure 5A:
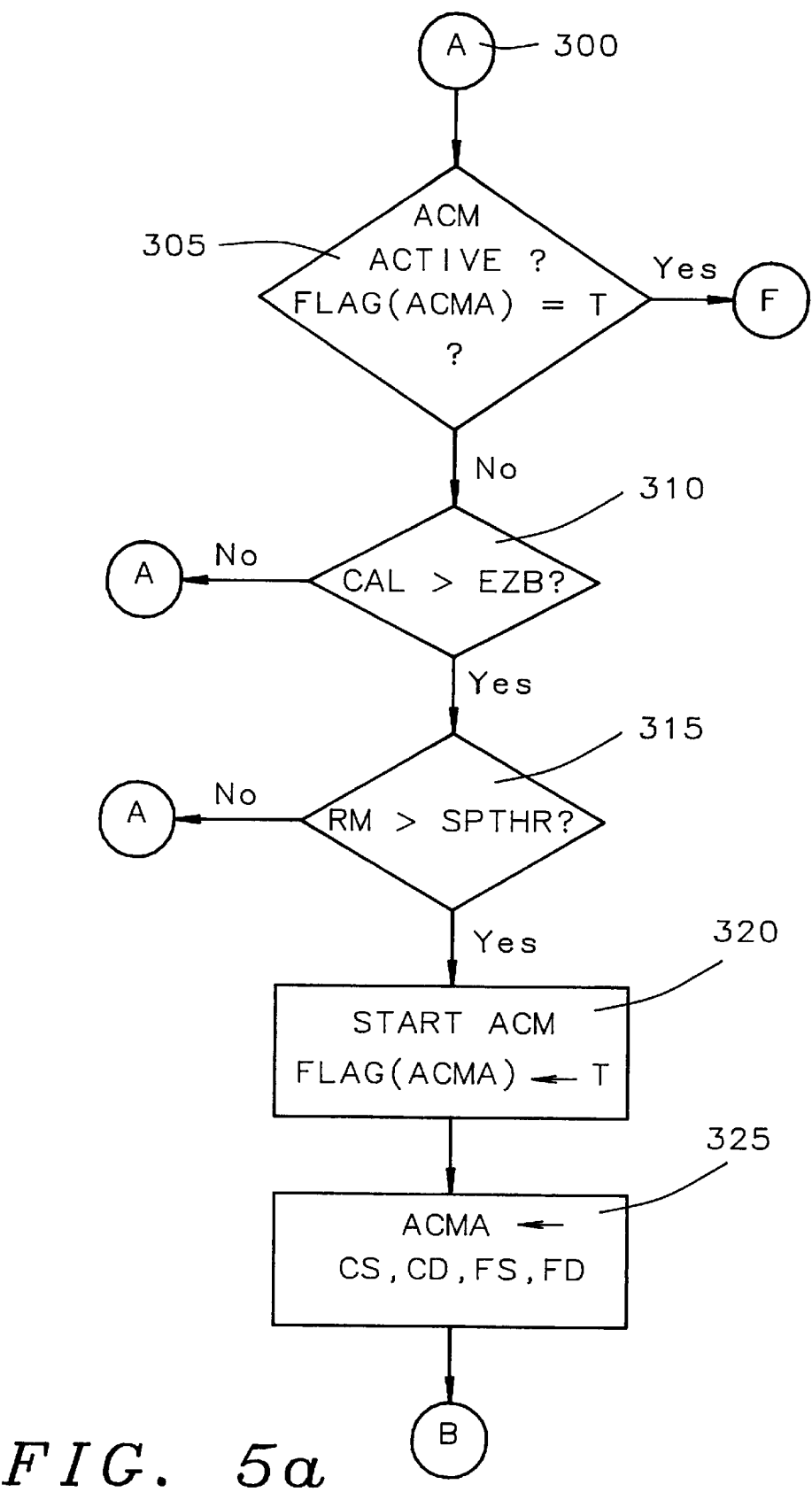
FIGS. 5a, 5b, 5c and 5d are algorithmic control diagrams of an automatic cursor motion controller of this invention
Figure 5B:
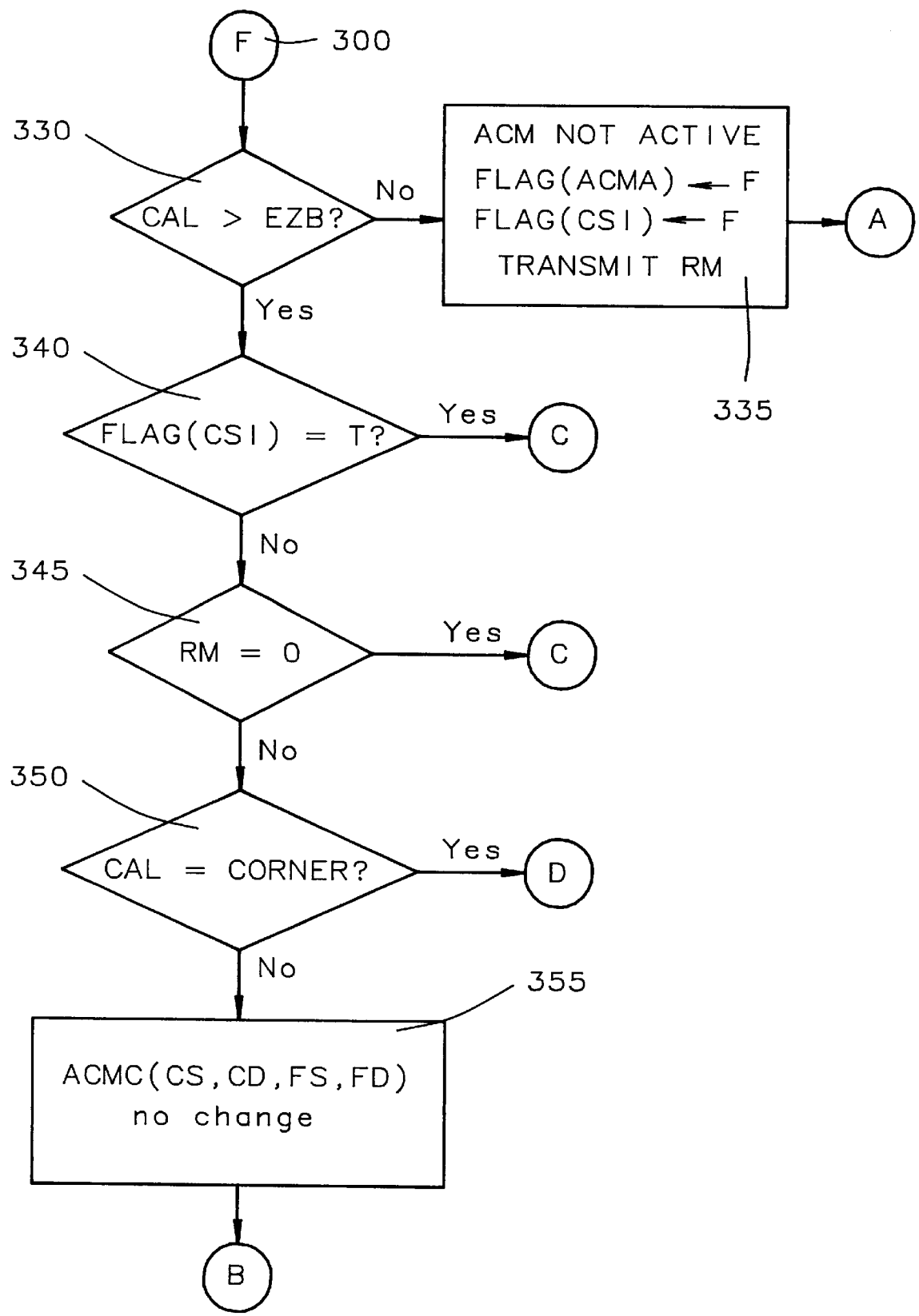
Figure 5C:
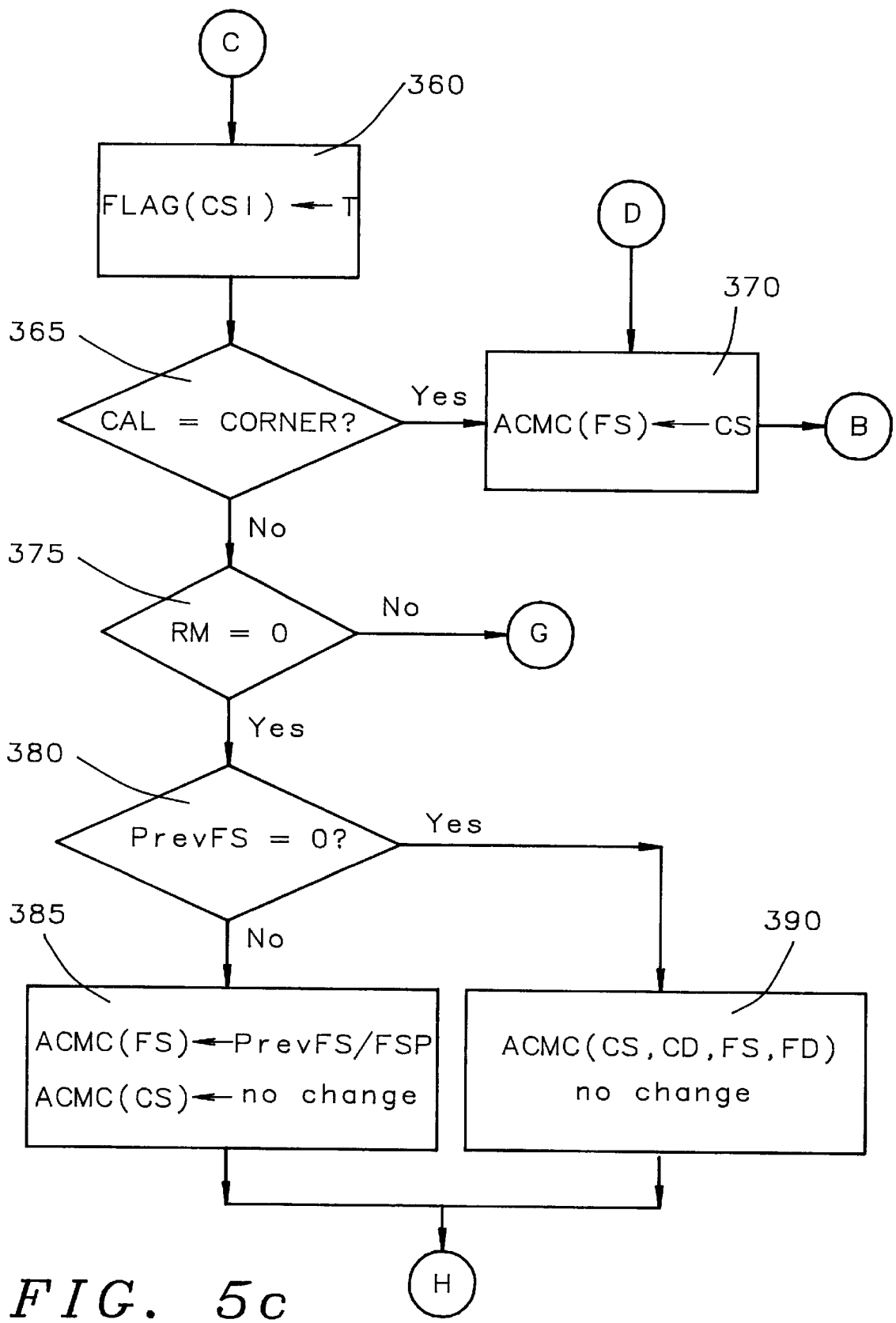
Figure 5D:
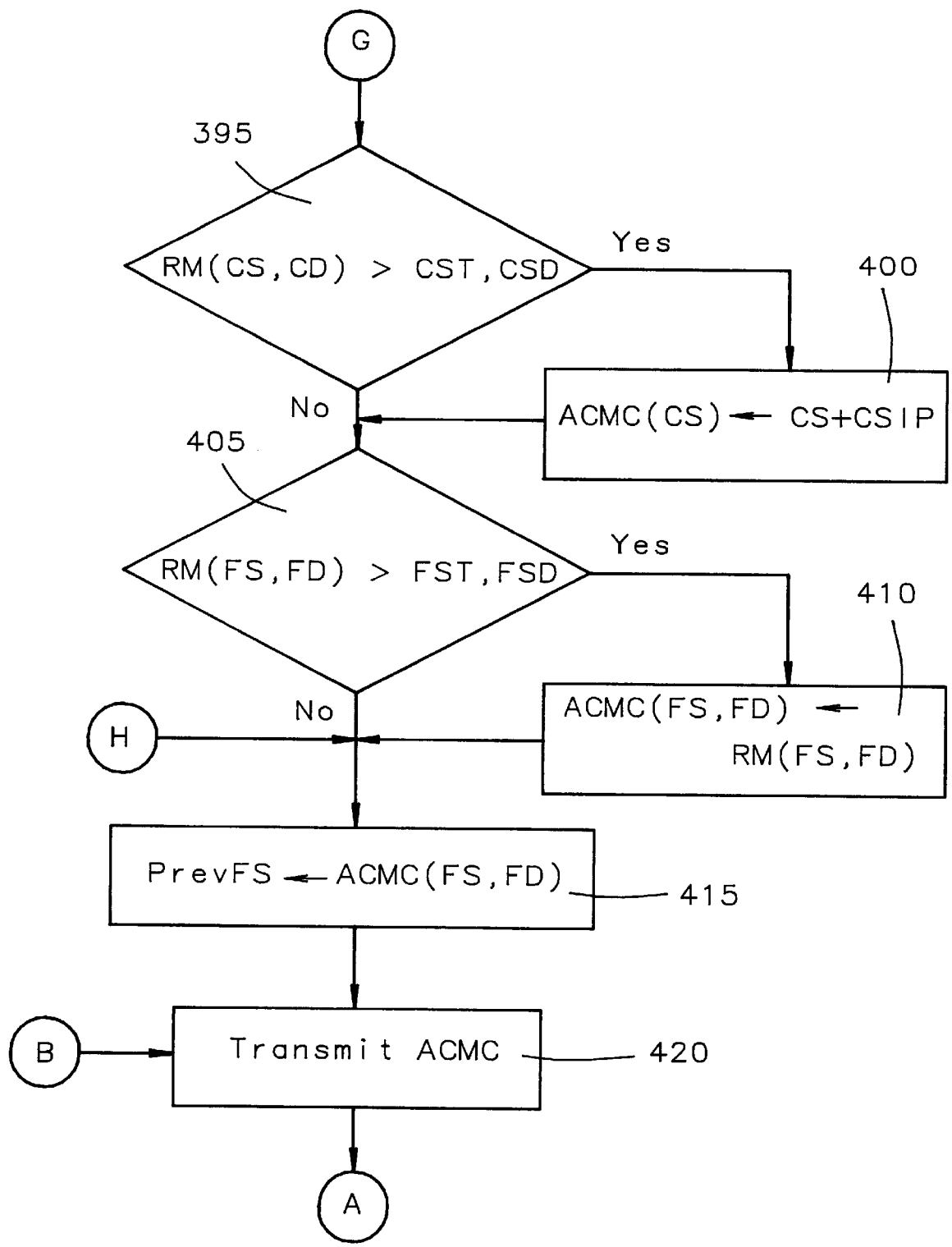
Figure 6A:
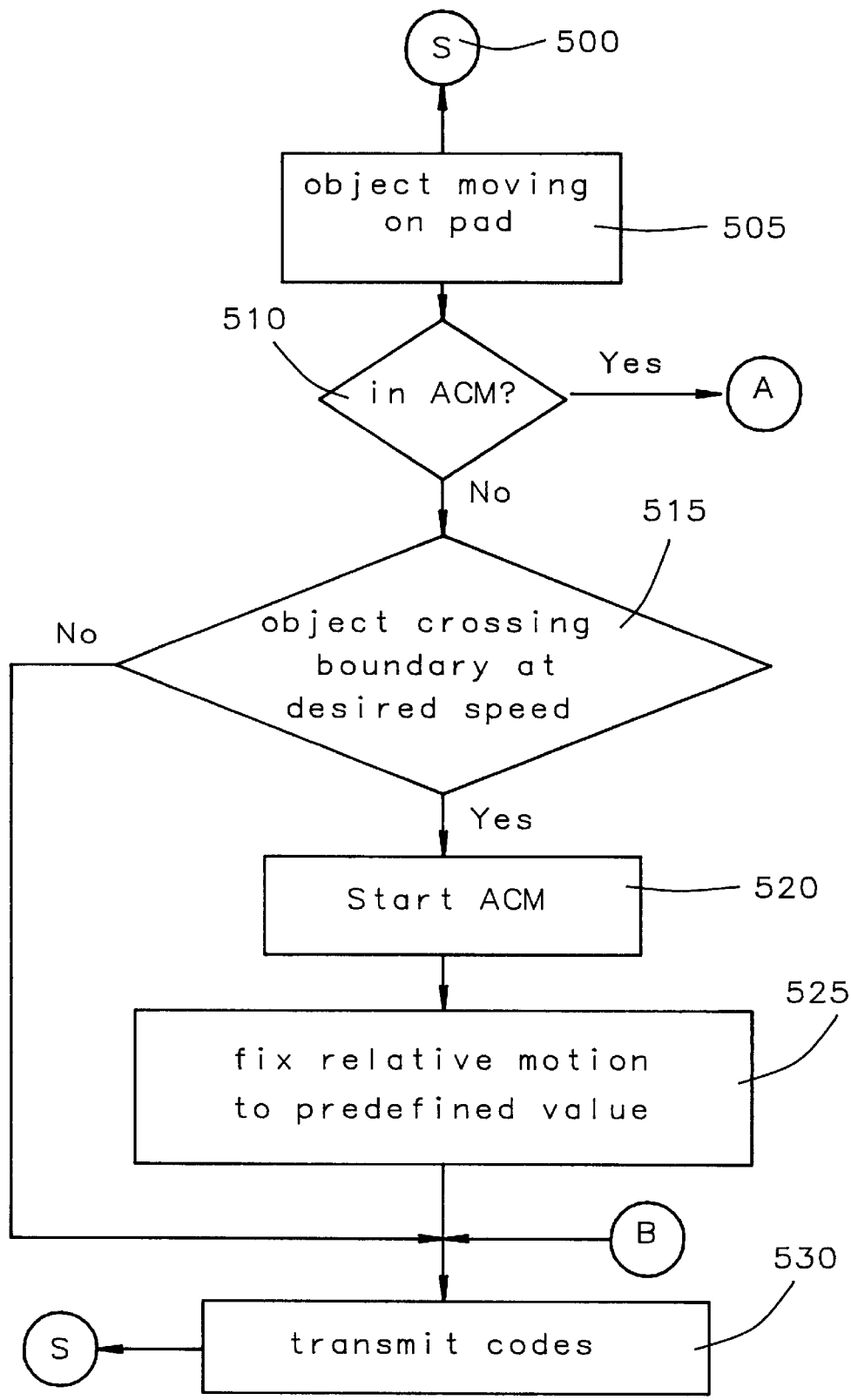
FIGS. 6a, 6b, 6c, and 6d are flow charts showing the method of automatic cursor motion control for a cursor on a display screen of a computer system using a touchpad of this invention.
Figure 6B:
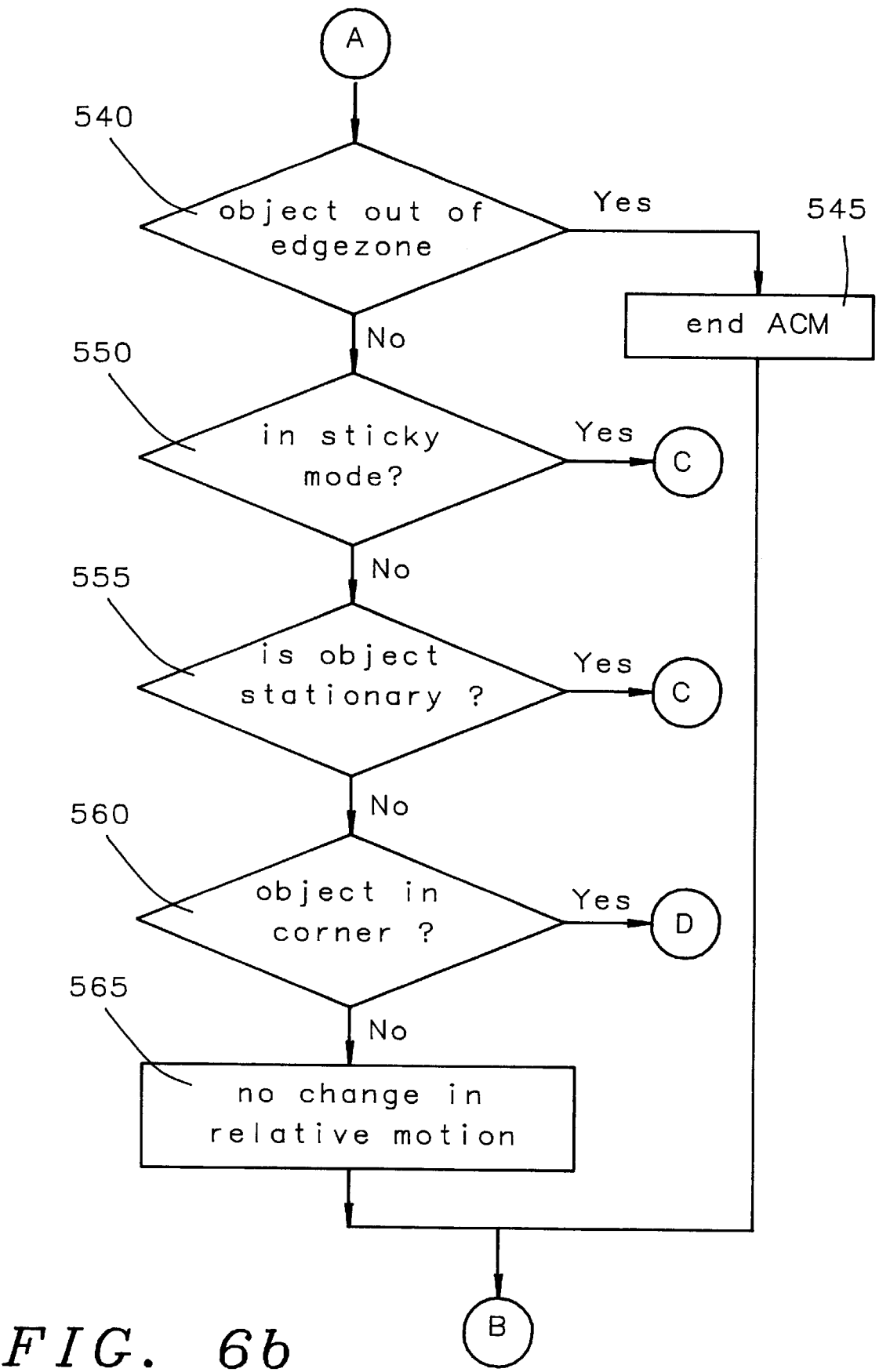
Figure 6C:
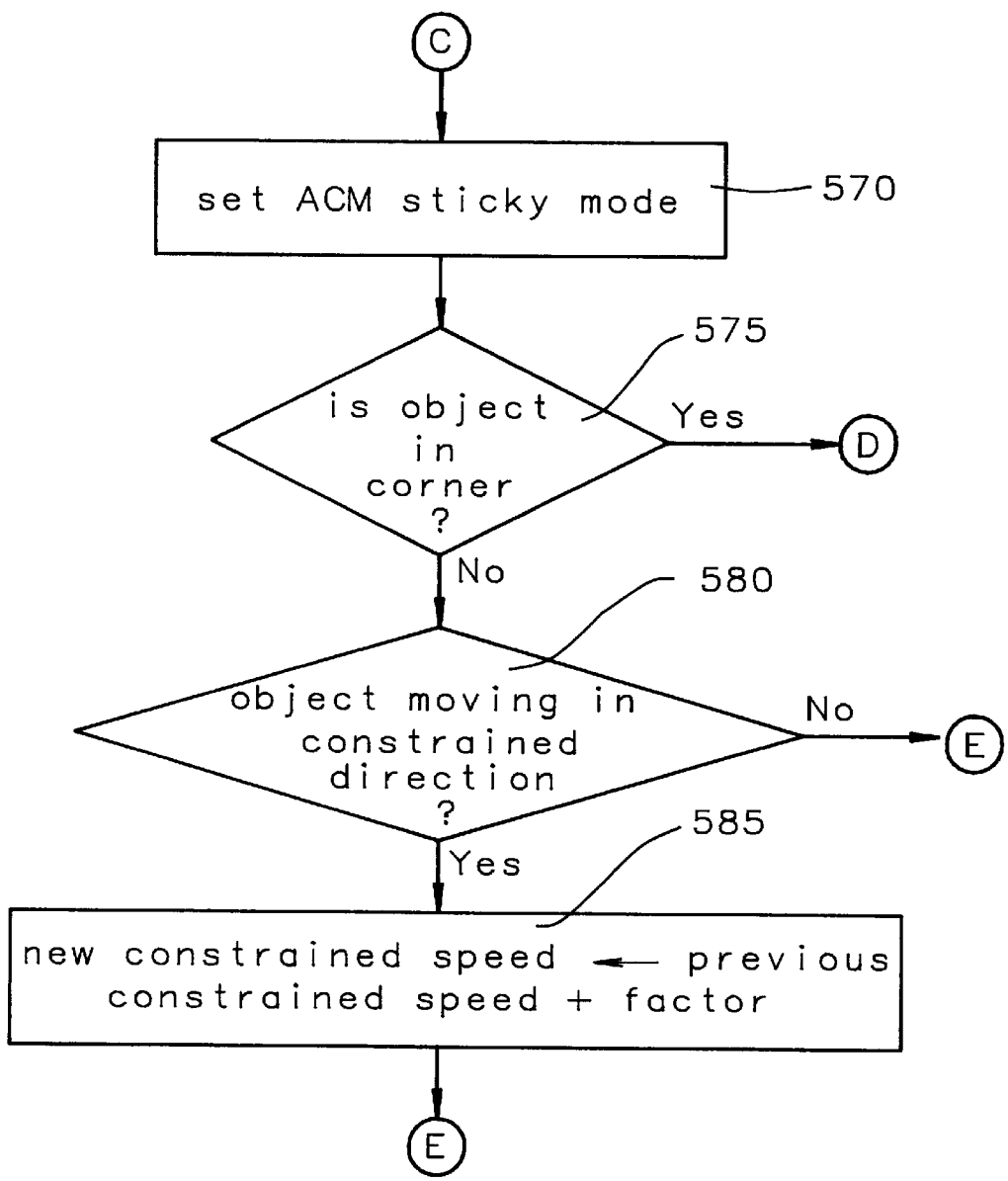
Figure 6D:
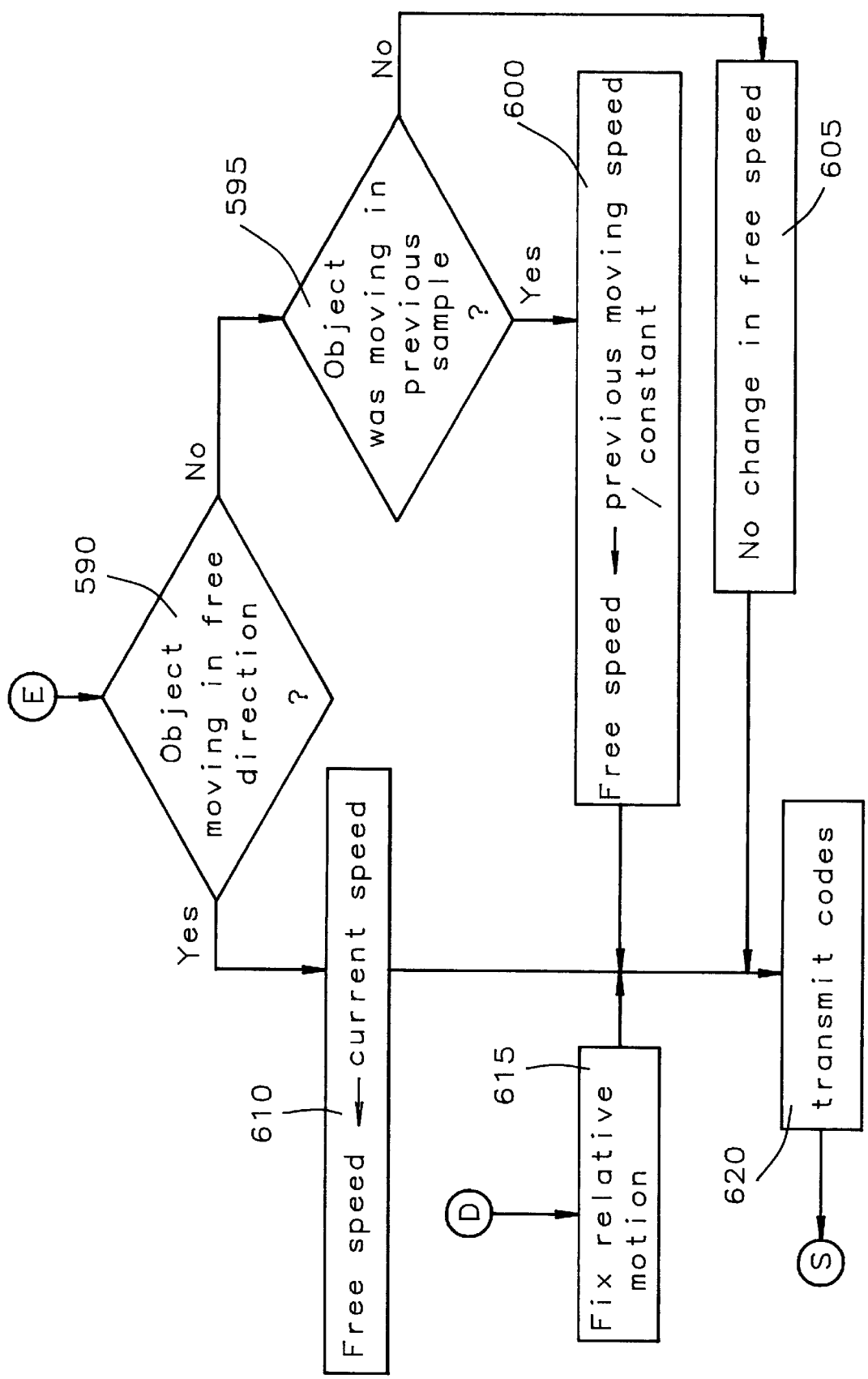

Referring to FIG. 4 one embodiment of the touchpad mouse controller 100 of the invention has a touchpad driver 120 which will provide a constant current as a stimulus to the touchpad 110. The touchpad driver 120 will provide a constant current source connected to the X+ line that is connected to the X-plane of the touchpad 110 and a constant current sink is connected to the X− line that is connected to the opposite side of the X-plane of the touchpad 110. The touchpad driver 120 will provide a second constant current source connected to the Y+ line that is connected to the Y-plane of the touchpad 110 and a second current sink that is connected to the Y− line that is connected to the Y-plane on the side opposite the connection of the Y+ line. As a pointed object such as a finger, stylus, or pen is moved across the touchpad, the resistance of the film changes causing the voltage at the current sources connected to the X+ line and Y+ line and at the current sinks connected to the X− line and Y− line to vary. The voltage variation will be proportional to the distance that the contact is from the edges of the touchpad where the X+ and Y+ lines and the X− and Y− lines are attached.

The voltages present at the connections of the current sinks connected to the X− and Y− lines are coupled 115 to an analog-to-digital converter 130. These voltages are converted at regular timing intervals to a set of ADC digital codes 135 representing the amplitude of the voltages present at the connections of current sinks connected to the X− and Y− lines that indicate the location of the pointed object pressed on the touchpad 110 surface.

The ADC digital codes 135 will divide the difference of the voltage range between the two reference voltage sources of the analog-to-digital converter into equal increments and each code will represent the value of each voltage increment. As an example, if the first voltage reference source for a resistive touchpad is the power supply voltage source Vdd and equals 5.0V and the second reference voltage source equals the ground reference point GND or 0.0V, an analog input signal equals 2.0V, and there are ten binary digits or 1024 increments in the digital code, then:

$$V_i = \frac{V_{i1} - V_{i2}}{2^n}$$

$$= \frac{5.0 - 0.0}{2^{10}} = 4.88 \text{ mv}$$

Where:

$V_1$ = magnitude of each voltage increment of the voltage divider $V_{i1}$ = the magnitude of the first reference voltage source.

$V_{i2}$ the magnitude of the second reference voltage source.

n = the number of bits or binary digits in the digital code.

To interpret the value of the digital code relative to the analog input signal, the digital code (DC) will have a decimal value of $$DC = \frac{V_a}{V_{i1} - V_{i2}} (2^n) = \frac{2.0}{5.0 - 0.0} (2^{10}) = 410$$

Where:

$V_a$=the magnitude of the analog input signal.

Figure 1:
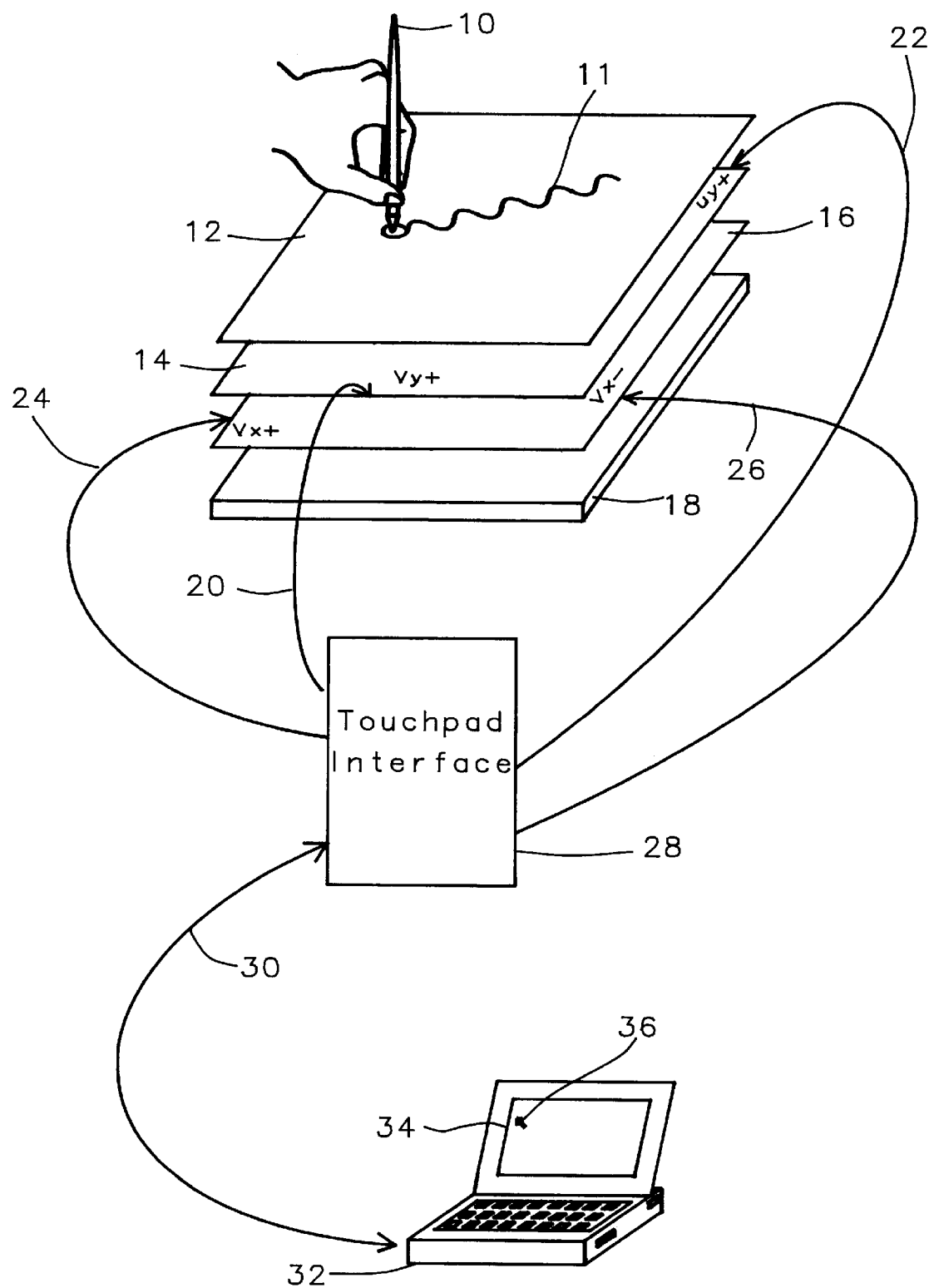
FIG. 1 is a diagram of a resistive film touchpad.
Figure 2:
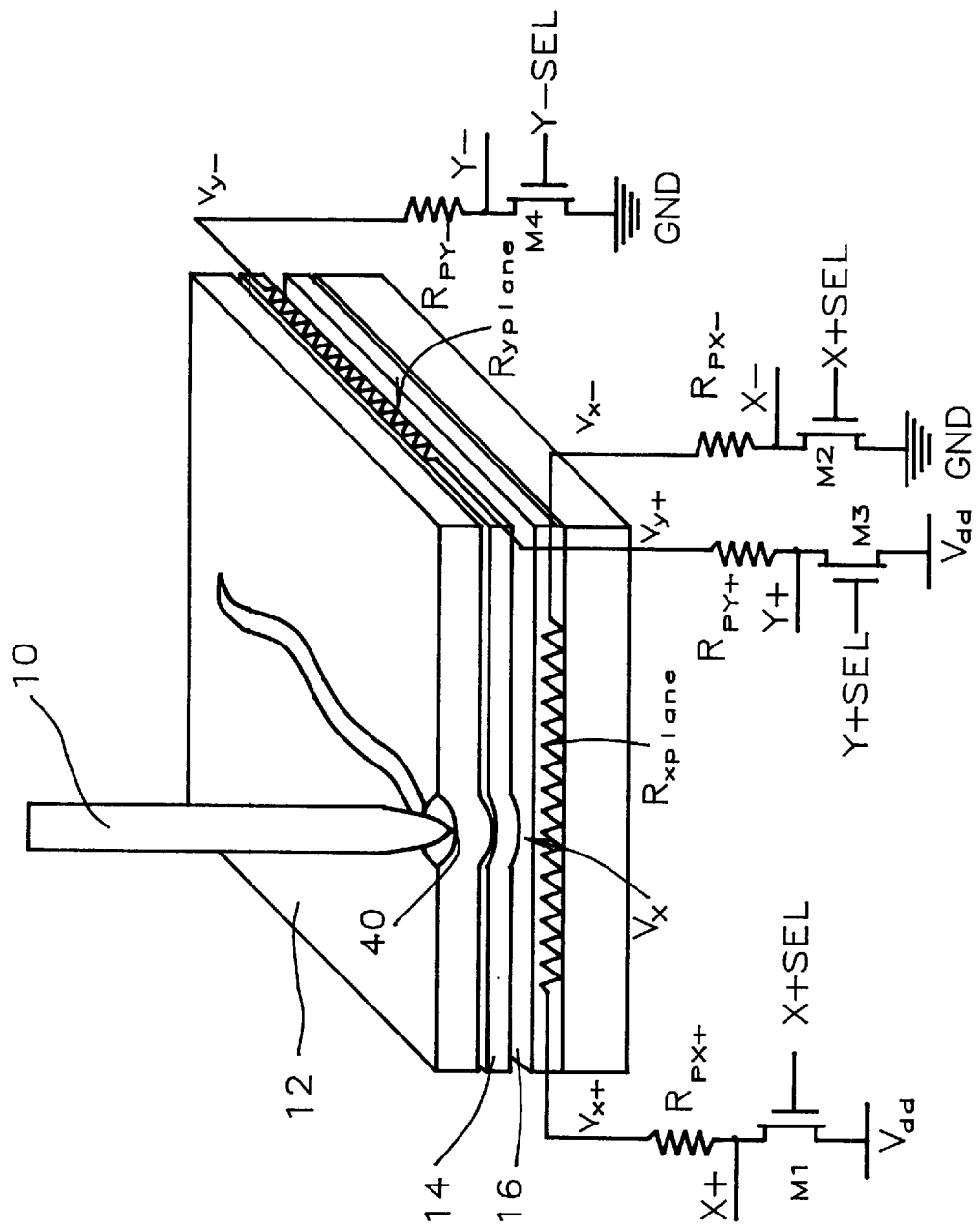
FIG. 2 is a diagram of a resistive film touchpad with a pointed object such as a pen on the touchpad showing an equivalent electrical circuit of the touchpad and the touchpad driver.

Since the power supply voltage source Vdd is connected directly to the first reference point and the ground reference point GND is connected to the second reference point of the analog-to-digital converter, the full count of the 1024 increments of a ten bit analog-to-digital converter will be from the power supply Vdd to the ground reference point GND. However, the sense points X+ and X– for the touchpad 110 are such that the parasitic resistances Rpx+, Rpx–, Rpy+, and Rpy– of FIG. 2 create a deadzone area. The coordinate system for the touchpad is shown in FIG. 3 The coordinate system will have increments that define the coordinates of the touchpad 110 from 0 to 1023 in the horizontal and vertical directions. The deadzone area 240 will be beyond the boundary of the touchpad 110. Since the parasitic resistances can not be accurately predicted in a production environment, the deadzone area 240 periphery will be dependent on manufacturing process variations. The deadzone area 240 periphery will be become a parameter that describes the outer boundary of the edgezone 230*a*, 230*b*, 230*c*, and 230*d*. The deadzone area 240 periphery is dependent on the magnitude of the parasitic resistors Rpx+, Rpx–, Rpy+, and Rpy– of FIG. 2. Because of the aforementioned variability of the deadzone area 240 periphery, the deadzone area 240 periphery is programmable as described in the patent application Attorney Docket Number TMI96-012 (Chan et al.) Ser. No. 08/785,726, filing date: Jan. 17, 1997, assigned to the same assignee, and incorporated herein by reference.

An example of the outer boundary of the edgezone area 230*a*, 230*b*, 230*c*, and 230*d* sets the left-most point of the horizontal axis and the upper-most of the vertical axis at the points 085 and the right most points of the horizontal axis and the lower-most point of the vertical axis at the points 938. These four points define the edges of the useable area of the touchpad 110.

In the example shown in FIG. 3, the boundary of the edgezone area 230*a*, 230*b*, 230*c*, and 230*d* and the workzone area 220 is set at 219 for the left-most point of the horizontal axis and the upper-most of the vertical axis and at 804 for the right most points of the horizontal axis and the lower-most point of the vertical axis. The width of the edgezone 230*a*, 230*b*, 230*c*, and 230*d* will be ultimately determined by the width of the human finger and the amount of space necessary to activate the automatic cursor motion control with a human finger upon the touchpad 110. The boundary of the edgezone 230*a*, 230*b*, 230*c*, and 230*d* will be adjusted dependent on the area of the deadzone 240 and the desired width of the edgezone 230*a*, 230*b*, 230*c*, and 230*d*.

Referring back to FIG. 4, the signal present at the X– line will be transferred to the pen detect circuit 140 which will set its output 145 to a first logic state when a change in the signal present at the X– line indicate that there has been a pointed object pressed on the touchpad 110 surface. The output 145 of the pen detect circuit 140 will assume a second state when the signal present at the X– line indicate that there is no object pressed on the touchpad 110 surface. The output 145 of the pen detect circuit 140 is retained in the pen detect register 174*i*.

The ADC digital codes 135 also are transferred to the absolute coordinate calculator 150. The absolute coordinate calculator 150 will translate the ADC digital codes 135 into a set of absolute coordinate digital codes 155 indicating the coordinate position on the touchpad 110 of the pointed object being pressed on the touchpad 110 at a specific point in time. A new set of absolute coordinate digital codes 155 will be generated with each new set of ADC digital codes at each of the regular timing intervals.

The set of absolute coordinate digital codes 155 are transferred to the current absolute location register 174*j*, while a previous set of absolute location digital codes are retained in a previous absolute location register 174*l*. The relative motion calculator 160 will retrieve the current coordinate digital codes 155 from the current absolute location register 174*j* and the previous absolute location register 174*l* and transfer the current and previous absolute location digital codes on the transfer bus 157. The relative motion calculator 160 will then calculate a set of relative motion digital codes 165 that are the speed and direction of the motion of the pointed object upon the surface of the touchpad 110. The relative motion digital codes 165 are then placed in the relative motion register 174*k*.

The pen detect signal 145 in the pen detect register 174*i*, relative motion digital codes 165 in the relative motion register 174*k* and the present absolute coordinate digital codes 155 in the present absolute register 174*j* are transferred to the autocursor motion controller 170 on transfer bus 167. The autocursor motion controller 170 is a selectable feature that when selected, will divide the touchpad 110 surface into a workzone and an edgezone, as described above.

The automatic cursor motion controller 170 will employ a plurality of registers 174*a*, . . . , 174*s* that will retain:

a) the boundary parameters for the edgezone 174*a*;

b) the threshold speed 174*b* at which the pointed object must cross the edgezone boundary to activate the automatic cursor motion control so as to prevent a false activation of the automatic cursor motion control;

c) the constrained speed parameter 174*c* which is the velocity that the cursor is to be scrolled in the constrained direction as described above;

d) the free-motion speed parameter 174*d* which is the small value (approaching zero) of the velocity that the cursor will be scrolled in the free-motion direction described above;

e) the constrained direction 174*e*;

f) the free-motion direction 174*f*;

g) the flag register 174*g* to indicate whether the automatic cursor motion controller 170 is active and has previously transmitted the autocursor digital codes 175 to the code conversion unit 180 and the automatic cursor motion controller can apply a "sticky" adjustment in the constrained direction by a constrained speed increment parameter 174*m*;

h) the autocursor motion code register 174*h* to contain the autocursor digital codes 175 for transmission;

i) the pen detect register 174*i* to retain the pen detect signal 145, j) the current absolute location register 174*j* to retain the current set of the absolute location digital codes 155;

k) the relative motion register 174*k* to retain the relative motion digital codes 165;

l) the previous absolute location register 174*l* to retain the previous set of the absolute location digital codes for the calculation of the relative motion digital codes 165 as described above;

m) the constrained speed increment parameter 174*m* that is the value that the constrained speed can be incremented to increase or decrease the constrained speed component of the autocursor digital codes 175;

n) the free-motion speed threshold 174n that is the minimum speed that the pointed object must be moving upon the touchpad to cause the autocursor digital codes 175 to be modified in the free-motion direction, so as to prevent unwanted changes in the autocursor digital codes 175 due to vibration or noise of the pointed object;

o) the free-motion direction threshold 174o that is the direction that the pointed object must be moving upon the touchpad to cause the autocursor digital codes 175 to be modified in the free-motion direction, so as to prevent unwanted changes in the autocursor digital codes 175 due to vibration or noise of the pointed object;

p) the free-motion division factor 174p that is the amount that the free-motion component of the autocursor digital codes will be divided by once the pointed object is made stationary after having been moved in the free-motion direction within the edgezone;

q) the constrained speed threshold 174q that is the minimum speed that the pointed object must be moving upon the touchpad to cause the autocursor digital codes 175 to be modified in the constrained direction, so as to prevent unwanted changes in the autocursor digital codes 175 due to vibration or noise of the pointed object;

r) the constrained direction threshold 174r that is the direction that the pointed object must be moving upon the touchpad to cause the autocursor digital codes 175 to be modified in the constrained direction, so as to prevent unwanted changes in the autocursor digital codes 175 due to vibration or noise of the pointed object; and s) the previous free-motion speed value 174s that is the value of the autocursor digital codes prior to the pointed object being brought to a stationary state so that the autocursor digital codes can be modified by the previous free-motion speed 174s divided by the free-motion division factor 174p.

The automatic cursor motion controller 170 will be a finite state machine that will produce, dependent upon the contents of the plurality of registers 174a, . . . , 174s, the appropriate autocursor motion digital codes 175 for transmission to the computer system to predictably control scrolling of the cursor upon the display screen. The autocursor motion digital codes 175 are retained in the autocursor motion register 174h. The contents of the plurality of registers 174a, . . . , 174s are transferred as required on the transfer bus 167 to the autocursor motion controller 170

The process for execution of the automatic cursor motion control by the automatic cursor controller 170 is shown in FIGS. 5a, 5b, 5c and 5d. Referring to FIGS. 4, 5a, 5b, 5c and 5d the process will begin at 300. An autocursor motion active bit within the flag register 174g that indicates that the automatic cursor motion controller 170 is active is tested 305. If the autocursor motion active bit in the flag register 174g indicates the automatic cursor motion controller 170 is not active, the current set of absolute location digital codes in the current absolute location register 174j are compared 310 to the boundary parameters for the edgezone 174a. If the comparison 310 indicates the pointed object is within the edgezone, the relative motion digital codes in the relative motion register 174k are compared 315 to the threshold speed 174b. If the relative motion digital codes in the relative motion register 174k indicates that the pointed object has not traversed the boundary with sufficient velocity, the process is returned to the beginning point A 300. If the comparison 315 indicates that the pointed object has traversed the boundary between the edgezone and the workzone with sufficient velocity, the autocursor motion active bit in the flag register 174g is assigned 320 a true value to indicate that the automatic cursor motion controller 170 is activated. The autocursor motion code register 174h is assigned the contents of the constrained speed register 174c, the constrained direction register 174e, free-motion speed register 174d, and the free-motion direction register 174f. The contents of the autocursor motion code register 174h is then transmitted 420. This will cause the cursor to move predictably on the display screen in constant direction at a constant speed. The process will then return to the beginning point A 300.

If the testing 305 of the autocursor motion active bit of the flag register 174g indicates the automatic cursor motion controller 170 is active, the current absolute location digital codes in the absolute location register 174j are compared 330 to the boundary parameters for the edgezone 174a to verify that the pointed object is within the boundaries of the edgezone. If the comparing 330 indicates the pointed object is not within the boundaries of the edgezone, but is within the workzone, the automatic cursor motion controller 170 is deactivated. The autocursor motion active bit and the constrained speed increment bit within the flag register 174g are assigned a false value to indicate the automatic cursor motion controller 170 is inactive. The relative motion digital codes 165 in the relative motion register 174k are then transmitted 335. The process is then returned to the beginning point A 300.

However, if the comparing 330 indicates the pointed object is within the boundaries of the edgezone, the constrained speed increment bit of the flag register 174g is tested 340 for a true value. The constrained speed increment bit of the flag register 174g indicates that the automatic cursor motion controller 170 is now not only active, but that the speed of the pointed object upon the touchpad in the constrained direction, as described above, will only increment the speed of the cursor in the constrained direction in a fixed amount. The amount of the incrementing in the constrained direction is retained in the constrained speed increment parameter register 174m.

If the testing 340 of the constrained speed increment bit of the flag register 174g indicates the bit has a false value, the relative motion digital codes in the relative motion register 174k are tested 345 to indicate whether the pointed object is in motion upon the touchpad. If the testing 345 indicates the pointed object is not in motion, the current set of absolute location digital codes in the current absolute location register 174j are compared 350 with the edgezone boundary parameters 174a to ascertain whether the pointed object has entered a corner area of the edgezone. If the comparison 350 determines the pointed object has not entered the corner area, the autocursor motion register 174h is not changed 355 and the contents of the autocursor motion register 174h are transmitted 420.

However, if the constrained speed increment bit is tested 340 as true or the relative motion digital codes indicate 345 the pointed object is not in motion on the touchpad, the constrained speed increment bit in the flag register 174g is set 360 to a true value.

If the current set of absolute digital codes in the current absolute location register 174i indicate 350 and 365, the pointed object is in the corner area of the edgezone, the free-motion component of the autocursor digital codes in the autocursor motion register 174h are assigned 370 the contents of the constrained speed register 174c or alternatively the free-motion component of the autocursor digital codes in the autocursor motion register 174h could be assigned the contents of a constant speed register (not shown) If the pointed object remains in the corner area, but is moving upon the touchpad, the autocursor digital codes in the autocursor motion register 174h are not modified as a result of this movement. The contents of the automatic cursor motion register 174h are then transmitted 420 and the process returns to the beginning point A 300.

When the relative motion register 174k is tested 375 and indicates the pointed object is in motion upon the touchpad, the constrained speed and direction component of the relative motion digital codes in the relative motion register 174k are compared 395 to the constrained speed threshold 174r and the constrained direction threshold 174q. The threshold prevents changes in the automatic cursor motion on the display screen due to unwanted or unintentional movement of the pointed object upon the touchpad. If the constrained speed and constrained direction components of the relative motion register 174k is larger than the constrained speed threshold 174r and the constrained direction threshold 174q, the constrained speed component of the automatic cursor digital codes in the automatic cursor register 174h is incremented 400 by the constrained speed increment parameter 174m.

If the constrained speed and the constrained direction component of the relative motion register 174k is smaller that the constrained speed threshold 174r or constrained direction threshold 174q or the constrained speed component of the autocursor motion register 174h has been incremented 400 by the contents of the constrained speed increment parameter 174m, the free-motion speed component and the free-motion direction component of the relative motion register 174h is compared 405 to the free-motion speed threshold 174n and the free-motion direction threshold 174o. If the free-motion speed component and the free-motion direction component of the relative motion register 174k is found to be larger that the free-motion speed threshold 174n and the free-motion direction threshold 174o, the free-motion speed component and the free-motion direction component of the relative motion register 174k is assigned 400 to the free-motion speed component and the free-motion direction component of the autocursor motion register 174h. The free-motion speed component and the free-motion direction component of the autocursor motion register 174h is assigned 415 to the previous free-motion register 174s and the autocursor motion register 174h is transmitted 420. The process is then returned to the beginning point A 300.

If the free-motion speed component and the free direction component of the relative motion register 174k is not greater than the free-motion speed threshold 174n and the free-motion direction threshold 174o, the free-motion speed component and the free-motion direction component of the autocursor motion register 174h is assigned to the previous free-motion register 174s and the contents of the autocursor motion register 174h are transmitted 420. The process is then returned to the beginning point A 300.

When the relative motion register 174k is examined 375 to determine movement of the pointed object upon the touchpad and there is in fact no movement, the previous free-motion register 174s is examined 380 for movement in the free-motion direction during the previous excursion through the process. If there was no movement in the free-motion direction on the previous excursion through the process, the autocursor motion register 174h is not changed 390. The previous free-motion register is assigned 415 the free-motion speed component and the free motion direction component of the autocursor motion register 174h. The autocursor motion register 174h is transmitted 420 and the process is returned to the beginning point A 300.

When the previous free-motion register 174s is examined 380 for movement in the free-motion direction during the previous excursion through the process and there was movement previously in the free-motion direction, the free-motion speed component of the autocursor motion register 174h is assigned 385 the value of the previous free-motion register 174s divided by the free-motion divisionfactor 174p. The free-motion division factor 174p will force the free-motion speed component of the autocursor motion register 174h to a small value. The constrained speed component of the autocursor motion register 174h will remain unchanged.

The previous free-motion register 174s will be assigned 415 the new free-motion speed component and the free-motion direction component of the autocursor motion register 174h. The autocursor motion register 174h is then transmitted 420 and the process is returned to the beginning point A 300.

Returning solely to FIG. 4, the automatic cursor motion control 170 will cease to generate the autocursor digital codes 165 if the pointed object transits from the edgezone 230a, 230b, 230c, and 230d, to the workzone 220 of the touchpad 110.

The absolute coordinate digital codes in the absolute location register 174j, the relative motion digital codes in the relative motion register 174k, and the autocursor motion digital codes in the autocursor motion register 174h are transferred to the code conversion unit 180. The code conversion unit 180 will create from the relative motion digital codes 155 and the autocursor digital codes 175 a mouse set of digital codes 185 that conform to industry standard computer input mouse protocols. These protocols may be those that conform to the Microsoft Corporation MS Mouse standard, the International Business Machines, Incorporated PSI2 Mouse standard, the Apple Computer, Inc. Apple Desktop Bus, and other accepted protocols.

The set of mouse digital codes 185 will be transferred to the serial interface 190 where they will be serialized and buffered so as to conform to the electrical specifications of the aforementioned industry standard computer input mouse protocols. The serialized codes 195 are transferred to the computer system to the control the movement of the cursor on a display screen of the computer system.

Referring now to FIGS. 6a, 6b, 6c, and 6d, to discuss a generalized method to produce predictable and controllable cursor movement upon a display screen with a pointed object such as a pen, stylus, or human finger upon a touchpad: The method is started at point S 500. The pointed object is in contact with the touchpad and moving 505 on the touchpad. If the control circuitry has not activated 510 the automatic cursor motion control, the speed and location of the pointed object is tested 515 to verify that pointed object has crossed the boundary between the workzone and the edgezone at a threshold speed. This will prevent unwanted activation of the automatic cursor motion control due to unintentional movement of the pointed object at the boundary of the workzone and the edgezone. If the pointed object has not crossed the boundary of the workzone and the edgezone or has crossed the boundary but not at a speed greater than the threshold speed, the autocursor motion control is not activated and the codes indicating the relative motion of the pointed object upon the touchpad are transmitted 530 to the computer system and the next sampling is take and the method returns to beginning point S 500.

If the pointed object has crossed the boundary of the workzone and the edgezone at a velocity greater than the threshold speed 515, the automatic cursor motion control is activated 520. The codes indicating the relative motion of the pointed object on the touchpad are now fixed 525 to a predefined value and transmitted 530 to the computer and the next sampling is taken and the method returns to the beginning point S 500.

If the automatic cursor motion control has been activated 510, the location of the pointed object is examined 540 to verify that the pointed object is still within the edgezone If the object has left the edgezone, the automatic cursor motion control is terminated and the codes indicating the relative motion of the pointed object upon the touchpad are transmitted 530 to the computer system and the next sampling is taken and the method returns to point S 500.

However, if the pointed object remains 540 in the edgezone, the mode of the automatic cursor motion control is examined 550 to determine if it is in a "sticky mode". A "sticky mode" implies that the speed of the cursor movement in the constrained direction can be modified by a fixed increment and is not determined by the velocity of the pointed object upon the touchpad. If the automatic cursor motion control is not in the "sticky mode", the relative motion of the pointed object is examined 555 for movement. If the pointed object is not moving on the touchpad, the location of the pointed object is examined 560 to determine if the pointed object is in a corner area of the edgezone. If the pointed object is not in a corner area of the edgezone, the codes indicating the relative motion are not modified 565 from the predefined values described above and are then transmitted 530 to the computer system.

If the automatic cursor motion control is in the "sticky mode" 550. or the pointed object is stationary upon the touchpad 555, the automatic cursor motion control is placed 570 in the "sticky mode". The location of the pointed object is again examined 575 for being in a corner area of the touchpad. If the pointed object is in the corner area of the edgezone 560 or 575, the relative motion is fixed 615 in both the constrained direction and the free-motion direction to predefined values and transmitted 620 to the computer system. These predefined values allow for motion of the cursor to be in predictable manner at a diagonal direction on the display screen. If the pointed object is in the corner area of the edgezone and is moving, the relative motion will not be modified and the cursor will continue to move in the diagonal direction.

If the pointed object is not in the corner area of the edgezone 575, the relative motion of the pointed object is examined 580 to determine if the pointed object is moving in the constrained direction. If the pointed object is moving in the constrained direction 580, the constrained speed component of the codes containing the relative motion is incremented 585 by a constrained speed increment factor. If the pointed object is not moving in the constrained direction 580 or the constrained speed component has been incremented 585, the relative motion of the object is examined 590 to determine that the pointed object is moving in the free-motion direction. If the pointed object was not moving in the free-motion direction in the previous sampling of the relative motion of the pointed object 695, the free motion component of the codes containing the relative motion are assigned 600 the value of the previous moving speed in the relative motion direction divided by a free motion division factor. The free motion division factor is a relatively large number that will cause the free motion component of the codes containing the relative motion to be made very small. Or if the pointed object was not moving in the free-motion direction in a previous sampling of the relative motion of the pointed object 595, the free-motion component of the codes containing the relative motion are not changed 605. The codes are then transmitted 620 to the computer system and the method returns to the point S 500 for a new sampling of the relative motion of the pointed object upon the touchpad.

If, however, the pointed object was moving in the free motion direction in a previous sampling of the relative motion of the pointed object 595, the free-motion component of the codes containing the relative motion that the cursor is to be moved are assigned 610 the current value of the speed of the pointed object upon the touchpad in the free-motion direction. The new codes containing the new relative motion the cursor is to be moved will be transmitted 620 to the computer system and the method will return again to the beginning point S 500.

The automatic cursor motion control of the invention allows predictable and controllable scrolling of a cursor on a display screen without the need for a "rowing" motion of the pointed object on the touchpad, or having to stop the pointed object in a special area of the touchpad to initiate a scrolling of the cursor. The automatic cursor motion control also allows a change in speed and direction of a cursor upon a display screen in both a horizontal and a vertical direction while the pointed object is within the edgezone area.

Furthermore, the automatic cursor motion control of the invention provides threshold levels to prevent false activation of the automatic cursor motion control by unintended movement of the pointed object into the edgezone from the workzone. The automatic cursor motion control will have thresholds for the constrained motion and the free-motion directions to prevent altering the automatic cursor motion of the cursor upon the display screen due to unintentional movements.

Further, to provide for predictable changes in speed and direction while the pointed object is in the edgezone, the automatic cursor motion is structured to allow only fine adjustments of speed of the cursor in the constrained motion direction (since there is very little room for movement of the pointed object in the constrained direction), while insuring quick response of the cursor to changes in the free-motion direction.

Also, the automatic cursor motion will detect that the pointed object has become completely stationary before initiating a "sticky mode." This will insure that the cursor will move on the display screen in a predictable manner and that the velocity is changed in a controllable fashion. If the "sticky mode" were initiated while the pointed object was moving, the movement in the constrained direction would cause successive incrementing of the velocity component in the constrained direction, thus causing the cursor to move ever more rapidly across the display screen or to appear to "run away" uncontrollably.

Additionally, when the pointed object has become stationary after having been moving in the free-motion direction, the modification of the speed in the free-motion direction to a small value relative to the relative motion in the free-motion direction, will add controllability to the movement of the cursor during the automatic cursor motion control. The small value will be the result of dividing the velocity of the movement of the pointed object in the free motion direction by a free-motion division factor.

Further still, the pointed object may be moved in any arbitrary direction within the edgezone, and so is not limited to movement only in the free motion direction or only in the constrained motion direction. This allows for complete freedom of movement of the pointed object in the edgezone.

Finally, behavior of the cursor while the pointed object is in a corner of the touchpad edgezone is also made predictable by the inventive technique of setting the speeds in both directions to be constrained, with each having the same or slightly different values.

As is evident to those skilled in the art, the process of FIGS. 5a, 5b, 5c and 5d and the method of FIGS. 6a, 6b, 6c and 6d may be implemented on a digital integrated circuit as a finite state machine as described, or implemented with any other sequential and combinatorial logic design technique, or as a program within a microprocessor or microcontroller. It is also evident that it is possible to implement the aforedescribed processes and methods in analog circuitry where the digital codes describing the absolute location and the relative motion of the pointed object upon the touchpad could be represented as analog voltages, currents, or frequencies.

While this invention has been particularly shown and described with reference to the preferred embodiments thereof, it will be understood by those skilled in the art that various changes in form and details may be made without departing from the spirit and scope of the invention.

What is claimed is:

1. A method for automatic cursor motion control of a cursor upon a display screen of a computer system, by a pointed object upon a touchpad having a workzone and an edgezone, comprising the steps of:
    a) moving said pointed object within said workzone with a relative motion, wherein said relative motion comprises a speed and a direction, such that the cursor is made to scroll at a similar speed and direction as said pointed object across said display screen;
    b) if the pointed object transits a boundary of said workzone at a speed greater than a threshold speed, activating said method for automatic cursor motion control;
    c) if said method of automatic cursor motion control is activated, fixing the current speed in a constrained motion direction to a first magnitude and setting the current speed in a free-motion direction to a second magnitude, whereby the cursor is moved across said display screen in a predefined direction and at a predefined speed;
    d) if said pointed object becomes stationary in said edgezone, activating a sticky mode whereby the cursor continues to movein said predefined direction and at said predefined speed;
    e) if said pointed object transits from said edgezone to said workzone, terminating said method for automatic cursor motion control and resuming movement of said cursor with a similar speed and direction as said pointed object; and
    f) if said pointed object is removed from said touchpad, discontinuing movement of the cursor.

2. The method of claim 1 wherein the first magnitude is a first programmable constant.

3. The method of claim 1 wherein the second magnitude is less than the first magnitude and is a second programmable constant which may be set to zero.

4. The method of claim 1 further comprising the steps of:
    a) if said sticky mode is activated and if said pointed object is moved in the constrained direction, setting the current speed in the constrained motion direction by modifying the previous speed in the constrained motion direction by a constrained speed increment factor.

5. The method of claim 4 wherein the constrained speed increment factor is a programmable constant, and wherein said constrained speed increment factor is added to said previous speed in the constrained direction if said pointed object is moving in the same constrained direction as when the pointed object first entered the edgezone, and is subtracted from said previous speed in the constrained direction if said pointed object is moving in a direction opposite to the constrained direction when it entered the edgezone.

6. The method of claim 1 further comprising the steps of:
    a) if said sticky mode is activated and if said pointed object is moved in said free-motion direction, setting the current speed in the free motion direction to the speed of the pointed object in the free motion;
    b) if said pointed object becomes stationary, setting the current speed in the free-motion direction to a reduced speed.

7. The method of claim 6 wherein said reduced speed is determined by dividing the previous speed in the free-motion direction by a free-motion division factor.

8. The method of claim 1 further comprising the steps of:
    a) if said sticky mode is activated and if said pointed object is moving in an arbitrary direction, resolving said arbitrary direction into a constrained motion component and a free motion component;
    b) using said constrained motion component to set the current speed in the constrained motion direction by modifying the previous speed in the constrained motion direction by a constrained speed increment factor;
    c) using said free motion component to set the current speed in the free direction to the speed of the pointed object in the free motion direction; and
    d) if said pointed object becomes stationary, setting the current speed in the free motion direction to a reduced speed.

9. The method of claim 8 wherein said reduced speed is determined by dividing the previous speed in the free motion direction by a free motion division factor.

10. The method of claim 1 further comprising the step of:
    if said pointed object enters a corner area of said edgezone, setting the current speed in the free motion direction to be equal to the current speed in the constrained motion direction.

11. The method of claim 1 further comprising the step of:
    if said pointed object enters a corner area of said edgezeon, setting the current speed in the free motion direction to a programmable constant.

12. The method of claim 1 wherein the edgezone has a rectangular shape, a first axis parallel to two sides of the rectangular shape, a second axis orthogonal to the first axis, such that if the pointed object is in an edgezone area parallel to the first axis, the constrained motion direction is orthogonal to the first axis, the free-motion direction is parallel to the first axis; and if the pointed object is in the edgezone area parallel to the second axis, the constrained motion direction is orthogonal to the second axis and the free-motion direction is parallel to the second axis.

13. An automatic cursor motion control means within an electrical writing surface control means, to control a scrolling motion of a cursor upon a display screen of a computer system by a pointed object upon the electrical writing surface, when said pointed object has transited from a workzone area to an edgezone area on said electrical writing surface, wherein said scrolling will have a constrained motion component and a free-motion component, comprising:

a) an absolute location registering means to retain a periodic sampling of an absolute location signal from said electrical writing surface control means;

b) a relative motion registering means to retain a current relative motion signal containing a speed and direction of said pointed object upon said electrical writing surface and calculated by said electrical writing surface control means;

c) a plurality of programmable initialization registering means to contain a set of initialization parameters, wherein in said set of initialization parameters comprises:

edgezone area boundary parameters to define the edgezone area upon said electrical writing surface, a boundary speed threshold parameter to describe a minimum speed at which the pointed object must transit from said workzone area to said edgezone area to activate said automatic cursor motion control means, a constrained speed parameter to define in a constrained direction a first default speed for said cursor upon activation of said automatic cursor motion control means, a free-motion speed parameter to define a second default speed in a free-motion direction for said cursor upon activation of said automatic cursor motion control means;

a constrained speed threshold parameter to define a minimum movement at which said constrained motion component may be modified, a free-motion threshold parameter to defined a minimum movement at which said free-motion component may be modified, and a free-motion dividing factor to define an amount said free-motion component may be modified;

d) an automatic cursor motion registering means to retain and transmit a autocursor signal to other circuitry within said electrical writing surface control means;

e) an automatic cursor motion processor means to execute an automatic cursor motion control process to create an autocursor signal that will cause said scrolling of said cursor upon said display screen in a predefined direction and at a predefined speed, wherein said automatic cursor motion control process comprises the steps of:

beginning of said automatic cursor motion control process, comparing the absolute location registering means to the edgezone boundary parameters, if the absolute location registering means indicates the pointed object has transited the boundary between the workzone area and the edgezone area, comparing the speed component of the relative motion registering means with the speed threshold parameter, if the speed component of the relative motion registering means is smaller than the speed threshold parameter, returning to said beginning, if the speed component of the relative motion registering means is greater than the speed threshold parameter, setting an activation semaphore to indicate said automatic cursor control means has been activated and placing the constrained speed, the constrained direction, the free-motion speed and the free-motion direction in the autocursor motion register; and transmitting the autocursor motion signal; and
returning to said beginning; and f) a status registering means to retain a status progression word, wherein said status progression word comprises:

said activation semaphore to indicate that said automatic cursor motion control means has been activated, a constrained direction semaphore to indicate the constrained direction, and a free-motion direction semaphore to indicate the free-motion direction.

14. The control means of claim 13 wherein the automatic cursor motion control process further comprises the steps of:

a) examining the activation semaphore;

b) if said activation semaphore indicates said automatic cursor motion control means is active, comparing the absolute location registering means to said boundary parameter to verify that said pointed object has transited from said edgezone to said workzone;

c) if said comparing indicates that the pointed object has transited from said edgezone and is in said workzone, initializing the status registering means to deactivate the automatic cursor motion control means and resetting the activation semaphore to indicate said control means has been deactivated; and d) returning to said beginning.

15. The control means of claim 13 wherein the automatic cursor motion control process further comprises the steps of:

a) further comparing the absolute location registering means to the edgezone boundary parameters to determine if the pointed object is in a corner area of said edgezone;

b) if the absolute location registering means indicates said pointed object is in said corner area, the constrained speed parameter will replace the free-motion speed parameter in the automatic cursor motion registering means;

c) transmitting said set of autocursor motion signal to the computer system; and d) returning to said beginning.

16. The control means of claim 13 wherein said initialization parameters further comprise a corner velocity parameter to define the speed in the free-motion direction of said cursor when said pointed object is within a corner area of the electrical writing surface; and wherein said corner velocity parameter will replace said free-motion speed parameter in the automatic cursor motion registering means.

17. The control means of claim 16 wherein the automatic cursor motion control process further comprises the steps of:

a) further comparing the absolute location registering means to the edgezone boundary parameters to determine if the pointed object is in a corner area of said edgezone;

b) if the absolute location registering means indicates said pointed object is in said corner area, said corner velocity parameter will replace the free-motion speed parameter in the automatic cursor motion registering means;

c) transmitting said set of autocursor motion signal to the computer system; and d) returning to said beginning.

18. The control means of claim 13 wherein the automatic cursor motion control process further comprises the steps of:

a) if the relative motion registering means indicates the pointed object is stationary upon said electrical writing surface, activating a sticky mode and continued transmitting of said set of autocursor signal;

b) if the relative motion registering means indicates the pointed object is moving upon said electrical writing surface, comparing the relative motion registering means to the constrained direction semaphore; and c) if the pointed object is moving in the constrained direction at a speed greater than the constrained speed threshold parameter, modifying a constrained speed component of the automatic cursor motion registering means by a constrained speed increment factor, assigning the modified constrained speed registering means to the set of autocursor signal, transmitting said set of autocursor signal, and returning to said beginning.

19. The control means of claim 18 wherein if said sticky mode is activated and if the pointed object is moving a positive constrained direction said constrained speed increment factor is added to said constrained speed component of the automatic cursor motion registering means.

20. The control means of claim 18 wherein if said sticky mode is activated and if the pointed object is moving in a negative constrained direction said constrained speed increment factor is subtracted to said constrained speed component of the automatic cursor motion registering means.

21. The control means of claim 18 wherein the automatic cursor motion control process further comprises the steps of:

a) comparing the relative motion registering means to the free-motion direction semaphore and the free-motion speed parameter;

b) if the pointed object is moving in the free-motion direction at a speed greater than the free-motion threshold parameter, assigning the speed component in the free-motion direction of the relative motion registering means to the free-motion component of the autocursor motion registering means;

c) transmitting said autocursor signal thus causing said cursor to scroll diagonally upon said display screen; and d) returning to said beginning.

22. The control means of claim 21 wherein the automatic cursor motion control process further comprises the steps of:

a) if said pointed object becomes stationary, setting the free-motion component of the autocursor motion registering means to a value that is the free-motion speed component of said autocursor motion registering means divided by afree-motion speed dividing factor;

b) transmitting said autocursor signal; and c) returning to said beginning.

23. The control means of claim 13 wherein the edgezone has a rectangular shape, a first axis parallel to two sides of the rectangular shape, a second axis orthogonal to the first axis such that if the pointed object is in an edgezone area parallel to the first axis, the constrained direction is orthogonal to the first axis, the constrained direction is orthogonal to the first axis and the free-motion direction is parallel to the first axis; and if the pointed object is in the edgezone area parallel to the second axis, the constrained direction is orthogonal to the second axis and the free-motion direction is parallel to the second axis.

* * * * *

UNITED STATES PATENT AND TRADEMARK OFFICE
CERTIFICATE OF CORRECTION

PATENT NO. : 5,880,717
DATED : 03/09/99
INVENTOR(S) : Chow Fong Chan, Eng Yue Ong, Swee Hock Alvin Lim, Xia Geng It is certified that error appears in the above-identified patent and that said Letters Patent is hereby corrected as shown below:

On the Cover Page, at (75), delete "Aluin", and replace with --Alvin--.

Signed and Sealed this

Twenty-eighth Day of September, 1999

*Attest:*

Q. TODD DICKINSON

*Attesting Officer*    *Acting Commissioner of Patents and Trademarks*